(No Model.) 2 Sheets—Sheet 1.

W. D. LINDSLEY.
SEEDING MACHINE.

No. 414,419. Patented Nov. 5, 1889.

ON LINE X—X

Witnesses:

Inventor:
W. D. Lindsley
By his Atty
Phil T. Dodge (No Model.) 2 Sheets—Sheet 2.
W. D. LINDSLEY.
SEEDING MACHINE.
No. 414,419. Patented Nov. 5, 1889.
Fig. 3.
ON LINE X—X
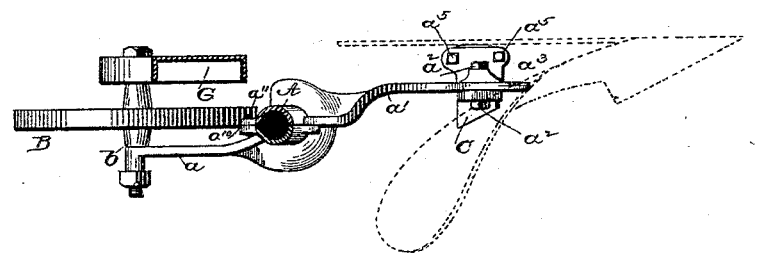
Fig. 4.
Fig. 5.
ON LINE Y—Y
Fig. 6.
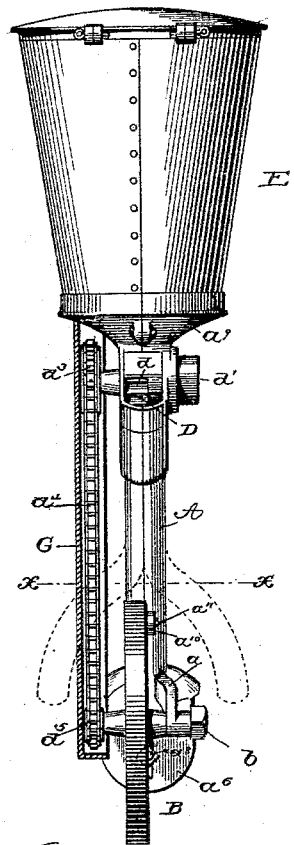
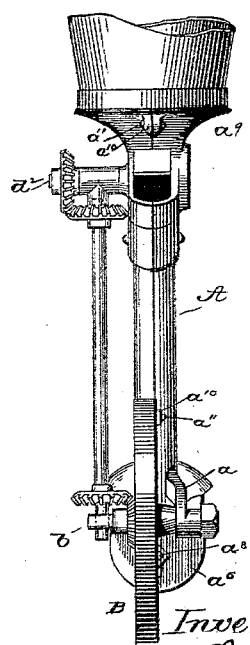
Witnesses:
W. W. Mortimer
H. R. Kennedy
Inventor:
W. D. Lindsley
By his Atty
Phil T. Dodge

UNITED STATES PATENT OFFICE.

WILLIAM D. LINDSLEY, OF HUNTSVILLE, KANSAS.

SEEDING-MACHINE.

SPECIFICATION forming part of Letters Patent No. 414,419, dated November 5, 1889.

Application filed March 14, 1889. Serial No. 303,277. (No model.)

*To all whom it may concern:*

Be it known that I, WILLIAM D. LINDSLEY, of Huntsville, in the county of Reno and State of Kansas, have invented certain Improvements in Seeding-Machines, of which the following is a specification.

The aim of this invention is to provide a simple device which may be attached to an ordinary mold-board plow for the purpose of distributing the seed in the furrow formed thereby.

To this end it consists in various features of construction hereinafter described and pointed out.

Figure 1:
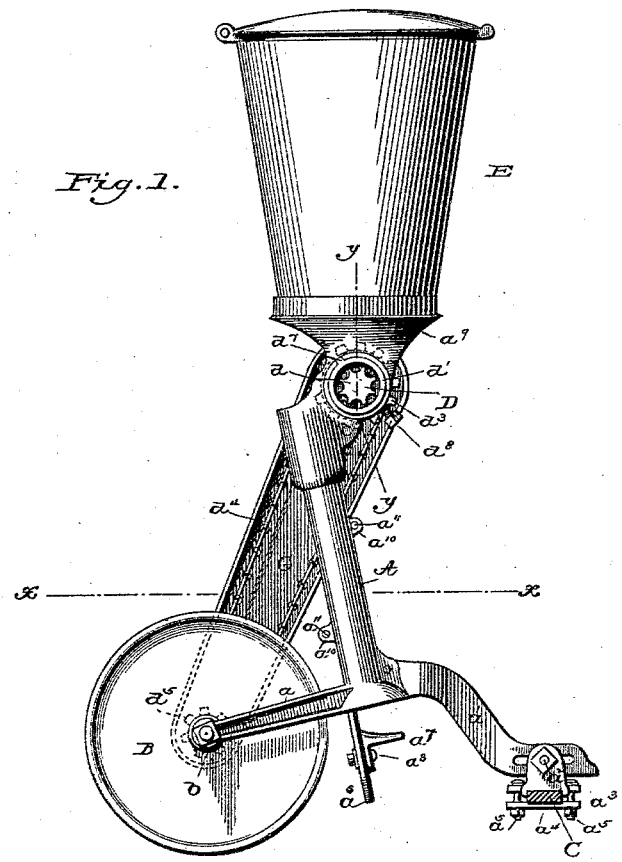
Figure 2:
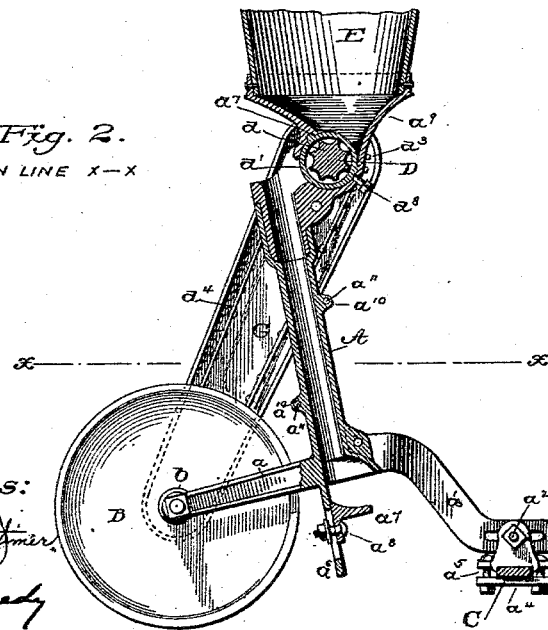

In the accompanying drawings, Figure 1 is a side elevation of my seeding attachment. Fig. 2 is a vertical central section of the same from front to rear. Fig. 3 is a horizontal section on the line $x\ x$ of Figs. 1, 2, and 4, looking in a downward direction. Fig. 4 is a rear elevation of the same, with the shield for the driving-chain in section. Fig. 5 is a vertical section through the feed mechanism on the line $y\ y$ of Fig. 1. Fig. 6 is a rear elevation of the driving-gear in modified form.

My attachment embraces as its essential features a tubular standard having at its bottom a sustaining-wheel, an arm and clip for attachment to the plow, and a scatterer for the seed, and having at its top a hopper and a seed-dropping mechanism driven from the furrow-wheel.

Referring to the drawings, A represents the tubular standard, having at the bottom the rigid rearwardly-extending arm $a$, to which the furrow-wheel B is journaled, and also the rigid forwardly-extending arm $a'$, the front end of which is connected by a horizontal pivot-bolt $a^2$ to a clip $a^3$. This clip consists of the upper plate having the ears to receive the pivot-bolt, and a lower plate $a^4$, connected to the upper plate by vertical bolts $a^5$. The clip thus constructed is intended and adapted to be applied rigidly to the cross bar or brace C, which is commonly used in mold-board plows to connect the landside and mold-board. The furrow-wheel B is mounted on the journal $b$, which is bolted or otherwise fixed rigidly in the end of the carrying-arm $a$.

The lower end of the standard is enlarged so as to form a flaring mouth, through which the seed is discharged, and below and at one side of this mouth is formed a rigid depending plate $a^6$, which supports a scattering-plate $a^7$, bolted to its face and adapted for vertical adjustment. The upper face of the scattering-plate is rounded downward, both laterally and in a forward direction, in order to effectually distribute the seed.

It is to be noted that the scattering-plate is of smaller size than the expanded mouth of the standard beneath which it stands, so that the mouth serves as a guard or fender to prevent the clods of earth from falling inward upon the scattering device or upon the seed before they are delivered into the bottom of the furrow. The scattering-plate is held by the horizontal bolt $a^8$, so that it may be released and tipped sidewise in either direction, in order to direct the seed mainly to the right or left. This is advantageous in that it adapts the apparatus for use with different styles of plows, some of which are so constructed as to forbid the trailing of the device in the middle of the furrow.

At its upper end the standard is enlarged to receive the seed-distributing roll D, and above this roll it is further enlarged to form the conical bottom $a^9$ of the hopper E. This hopper is commonly formed of sheet metal in a conical form, its lower end being inserted within and riveted fast to a flange on the edge of the part $a^9$, while its top is provided with a suitable cover. A seed throat or passage extends downward through the bottom of the hopper and the roll-chamber into the upper end of the standard.

The feed-roll consists of the longitudinal fluted portion $d$ and a sleeve $d'$ lying thereover. The roll D is provided with and driven by a journal $d^2$, extending horizontally through the side of the casing and provided on the outer end with a sprocket-wheel $d^3$, connected by a chain at $d^4$ to a sprocket-wheel $d^5$ on the hub of the furrow-wheel. The sleeve D is arranged to slide inward and outward through the side of the case, over and around one end of the roll, and is grooved internally to sustain the outer edge of a plate $d^6$, which is adapted to fit snugly around the roll $d$ and to revolve therewith. It will be perceived that the roll is made in one piece and cast over and around the edge of the disk, so that it serves alone as a means of sustaining and adjusting the same. As the roll revolves, it urges the seed descending from the hopper in a continuous stream rearward into the upper end of the standard, through which it descends to the scattering-plate and thence into the furrow. As the sleeve $d'$ is moved inward, carrying with it the plate $d^6$, it covers and renders inoperative a portion of the feed-roll, at the same time diminishing the size of the seed-passage, thus lessening the rate of feed.

In order to prevent the seed from finding its way over the back of the roll, the sleeve $d'$ is provided with a long rib or finger $d^7$, which extends across the top of the roll and through the casing of the opposite side. A set-screw $d^8$, tapped into the casing, serves to hold the sleeve in the required position.

The sprocket-chain is inclosed and protected on the outer side by a flanged metal plate or shield G, the ends of which are secured, respectively, around the journal of the feed-roll and around the casing of the furrow-wheel, so that it serves as a connection between these parts to give increased strength to the structure.

It will be observed that the connecting-arm $a'$, the furrow-carrying arm, the chamber for the feed-roll, and the bottom of the hopper all form integral parts of the standard.

The standard is commonly cast in two complementary halves provided with suitable ears $a^{10}$ to receive connecting bolts or rivets $a^{11}$. It is to be noted that the plane of division is a vertical one extending from front to rear and that the arm $a'$ is formed on one of the parts, while the wheel-carrying arm $a$ is formed on the other, this being the preferred construction on account of the ease with which the parts may be cast.

It will be perceived that the hopper and seed-delivering mechanism are sustained by the standard through which the seed is delivered, and that the attachment as a whole has but a single connection to the plow, this arrangement permitting the entire attachment to ride smoothly in the furrow notwithstanding the inequality in the movement of the plow.

In place of the sprocket wheels and chain above described for communicating motion from the ground-wheel to the seeding mechanism, I may employ an upright shaft connected at its ends by beveled gearing to the feed-roll and furrow-wheel, respectively, as shown in Fig. 6.

Having thus described my invention, what I claim is—

1. A seeding attachment for mold-board plows, comprising the tubular conductor, the seed-distributing mechanism at its top, a sustaining furrow-wheel, a rigid front arm, and a hinge-clip on said arm for connection with the plow-brace.

2. The seeding attachment for mold-board plows, consisting of a tubular standard having the hopper and seed-dropping devices fixed rigidly to its top, and having at its base the rigid arm provided with the pivoted clip and the second arm provided with the furrow-wheel geared to the seed-dropping devices, substantially as shown.

3. The combination of the tubular standard having the rear arm, the ground-wheel mounted on said arm and having the sprocket-wheel attached, the hopper mounted on the top of the standard, the seed cup or chamber, the feed-roll and its sprocket-wheel, the connecting-chain, and the chain-guard connected to the ground-wheel axle and the seed mechanism, whereby it is enabled to serve as a brace.

In testimony whereof I hereunto set my hand, this 21st day of February, 1889, in the presence of two attesting witnesses.

WILLIAM D. LINDSLEY.

Witnesses:
   J. J. CAMPBELL,
   J. S. COLE.